United States Patent
Brooks et al.

(10) Patent No.: US 7,443,395 B2
(45) Date of Patent: Oct. 28, 2008

(54) MULTI-VARIABLE OPERATIONS

(75) Inventors: Robin William Brooks, Gerrards Cross (GB); John Gavin Wilson, London (GB)

(73) Assignee: Curvaceous Software Limited, Gerrards Cross, Buckinghamshire (GB)

( * ) Notice: Subject to any disclaimer, the term of this patent is extended or adjusted under 35 U.S.C. 154(b) by 412 days.

(21) Appl. No.: 10/570,531

(22) PCT Filed: Sep. 6, 2004

(86) PCT No.: PCT/GB2004/003768

§ 371 (c)(1),
(2), (4) Date: Mar. 3, 2006

(87) PCT Pub. No.: WO2005/024350

PCT Pub. Date: Mar. 17, 2005

(65) Prior Publication Data

US 2007/0018982 A1 Jan. 25, 2007

(30) Foreign Application Priority Data

Sep. 4, 2003 (GB) ................................. 0320670.3

(51) Int. Cl.
*G06T 11/20* (2006.01)
*G05B 13/02* (2006.01)
*G06F 7/60* (2006.01)
*G06F 17/10* (2006.01)
*G06F 15/18* (2006.01)
*G06E 1/00* (2006.01)
*G06E 3/00* (2006.01)
*G06G 7/00* (2006.01)
*G06N 3/08* (2006.01)

(52) U.S. Cl. ............................ 345/440; 700/48; 703/2; 706/23; 706/25; 706/906

(58) Field of Classification Search ................. 345/440; 700/28, 31, 44, 45, 48, 83; 703/2; 706/12, 706/15, 16, 23, 25, 52, 902, 903, 906
See application file for complete search history.

(56) References Cited

U.S. PATENT DOCUMENTS 6,263,325 B1 * 7/2001 Yoshida et al. ................. 706/12

(Continued)

FOREIGN PATENT DOCUMENTS

EP 0 660 211 A2 6/1995

(Continued)

*Primary Examiner*—Crystal Barnes Bullock
(74) *Attorney, Agent, or Firm*—Davis Bujold & Daniels, P.L.L.C.

(57) ABSTRACT

Operation of a multi-variable process involves multidimensional representation of the value (p1-p12) of the process variables (P1-P12) according to individual coordinate axes, and an operational envelope (UB,LB) derived from a group of sets of values for the process and quality variables (P1-P12, Q1-Q2) accumulated from multiple, earlier operations of the process, defines an operating zone for the process and quality variables of the process. If the current value (p7) of any process variable (P7) goes outside the envelope, an envelope (UO,LB) for a different, wider grouping of the stored data-sets is displayed at least for the quality variables (Q1-Q2). A series of nested envelopes to provide stepwise enlargement of the operating zone may be provided, but non-nested envelopes can be used where there is clustering of acceptable values of process variables of the stored data-sets. The changes to control variables to bring the values of dependent variables within a best operating range can be determined.

18 Claims, 4 Drawing Sheets

U.S. PATENT DOCUMENTS

| | | | |
|---|---|---|---|
| 7,356,779 B2 * | 4/2008 | Cras et al. | 715/853 |
| 2004/0049295 A1 | 3/2004 | Wojsznis et al. | |

FOREIGN PATENT DOCUMENTS

| GB | 2 363 647 | 1/2002 |
|---|---|---|
| GB | 2 378 257 A | 2/2003 |
| GB | 2 378 527 A | 2/2003 |
| WO | WO 00/72268 | 11/2000 |
| WO | WO 01/02916 A1 | 1/2001 |
| WO | WO 03/025689 A2 | 3/2003 |

* cited by examiner

MULTI-VARIABLE OPERATIONS

This application is a national stage completion of PCT/GB2004/003768 filed Sep. 6, 2004 which claims priority from British Application Serial No. 0320670.3 filed Sep. 4, 2003.

FIELD OF THE INVENTION

This invention relates to multi-variable operations.

BACKGROUND OF THE INVENTION

The invention is particularly concerned with methods of operating a controllable multi-variable process and systems for use in the operation of such a process. Methods and systems of this kind are described in GB-A-2 363 647 and GB-A-2 378 527 in which a multi-dimensional display representation of the variables is derived according to individual, parallel or other spaced coordinate axes. The variables of the process are of two kinds, namely, process-variables, of which the current values are generally available during process operation, and quality-variables, of which the values are generally determined later by laboratory or similar measurement or analysis. A boundary or envelope for prospective operation of the process is defined within the system of axes in accordance with sets of values for the process- and quality-variables accumulated respectively from previous multiple operations of the process. Each previous operation is defined as a respective datapoint consisting of a set of values for the individual process- and quality-variables applicable to that operation.

The multi-dimensional display representation of these earlier-described methods and systems is of advantage in the control of the process by identifying in relation to the defined envelope whether the current operating point as represented by the current values of the process-variables, lies within the range of past experience, and facilitates prediction of the likely outcome of the process. It is an object of the present invention to provide a method of operating a controllable multi-variable process, and a system for use in the operation of such a process, of improved form.

SUMMARY OF THE INVENTION

According to respective aspects of the present invention there is provided a method, and a system, for operating a controllable multi-variable process, wherein in each aspect a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation selectively to one or other of a plurality of operational envelopes which are each derived from at least some of the accumulated sets of values and which define bounds for the variables and differ from one another in the bounds defined for at least one of the variables, the particular one of the envelopes in relation to which the current values are indicated being dependent on the current value of at least one of the process-variables.

The envelopes may be nested within one another, and in this case the envelopes may differ from one another in the bounds defined for the quality-variables. More especially, the particular one of the envelopes in relation to which the current values are indicated is changed when the current value of any one of the process-variables moves outside bounds defined for it by that envelope, the change being to another of the envelopes for which the bounds applicable to the quality-variables are wider.

The known methods and systems described in GB-A-2 363 647 and GB-A-2 378 527 involve the calculation and use of either of two envelopes. A first of these envelopes, termed the BOZ, representing the best operating zone of the process, is calculated from a selected, limited group of the sets of accumulated data, whereas the second envelope, a more general, outer envelope, is calculated from all the accumulated sets of data. This larger group includes the limited group used for the BOZ, and so the envelope of the BOZ lies wholly within the outer envelope. The two envelopes are used for different purposes in the known methods and systems, the outer envelope for the purpose of revealing the region within which operation of the process may take place within the bounds of past experience. The envelope of the BOZ, on the other hand, establishes the ranges of the individual process-variables that are applicable to realisation of 'good' results and provides a prediction of the ranges of the quality-variables that can be expected to be achieved. However, this prediction remains valid only while the values of all the process-variables remain within their respective BOZ-envelope limits.

The present invention enables a more flexible approach in that detection of the condition in which any one or more of the process-variables lies outside its respective BOZ-envelope limit, may bring about a change to another envelope for which the bounds applicable to the process-variables remain the same, but those for the quality-variables are those applicable to the outer envelope.

In accordance with a further feature of the present invention, a plurality of non-nested envelopes may be used, and in this case the current values may be indicated in relation to one or other of the envelopes in dependence upon whether the current value of an individual process-variable is within a respective part of its range of values. This may be used to provide different BOZ-envelopes for different parts of the range of values of one or more process-variables, so that a more accurate prediction of quality-variable values can be made.

The invention may be applied to optimisation of the process beyond what is directly achievable using the BOZ-envelope. To this end, the current value of one or more of the process-variables may be changed to bring about a change of envelope by which the lower limiting-bound indicated by it in relation to one or more of the quality-variables is increased whereas the upper limiting-bound in relation to another of the quality-variables is decreased. The advantage of this technique is that it enables the values of 'good' quality-variables to be increased at the same time as decreasing the values of 'bad' quality-variables, in a way more readily realisable than when operating solely within a BOZ-envelope.

According to features of the present invention there is provided a method, and a system, for operating a controllable multi-variable process, wherein a multi-dimensional display representation of the variables according to individual coordinate axes is derived, sets of values of process- and quality-variables accumulated respectively from previous multiple operations of the process are stored, first and second operational envelopes for the process- and quality-variables are calculated, the first and second envelopes being related respectively to bounds for the process- and quality-variables of the process and being derived from the accumulated sets of values to the extent that the first envelope is derived from a selected, limited group of the sets and the second envelope is derived from a larger group that includes said limited group, indicating current values of the process- and quality-variables on their respective axes, detecting the condition in which any of the current values of the process-variables lie outside the first envelope, and including representation in the display representation of the first or the second operational envelope at least insofar as it relates to the quality-variables, in dependence upon whether or not, respectively, said condition is detected.

Additionally, there is provided according to further features of the present invention, a method, and a system, for operating a controllable multi-variable process, wherein a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation to an operational envelope defining bounds for the process- and quality variables, the envelope being calculated from one or another of different parts of a selected group of the accumulated sets of values according to the current value of at least one of the process-variables, the part of the group from which the envelope is calculated comprising sets of the group which, in distinction to the sets of the other part or parts, have values for said one process-variable clustered on the current value thereof.

BRIEF DESCRIPTION OF THE DRAWINGS

A method and system according to the present invention will now be described, by way of example, with reference to the accompanying drawings, in which.

DETAILED DESCRIPTION OF THE INVENTION

The example of method and system to be described is related to the control of operation of a multi-variable process carried out by a simple, notional processing plant. Details of the plant and its purpose are not of consequence, and indeed the method and system of the invention are related more specifically to operation of the plant as an example of a multi-variable process rather than to the purpose of the process performed, being applicable in the generality to any situation involving a multi-variable process. In the context of initial description of the present specific example, however, there are fourteen variables involved in plant-operation, and of these, twelve are process-variables to the extent that their values determine the outcome of the process. The remaining two variables are quality-variables in the sense that their values define, or more especially are defined by, that outcome.

Figure 1:
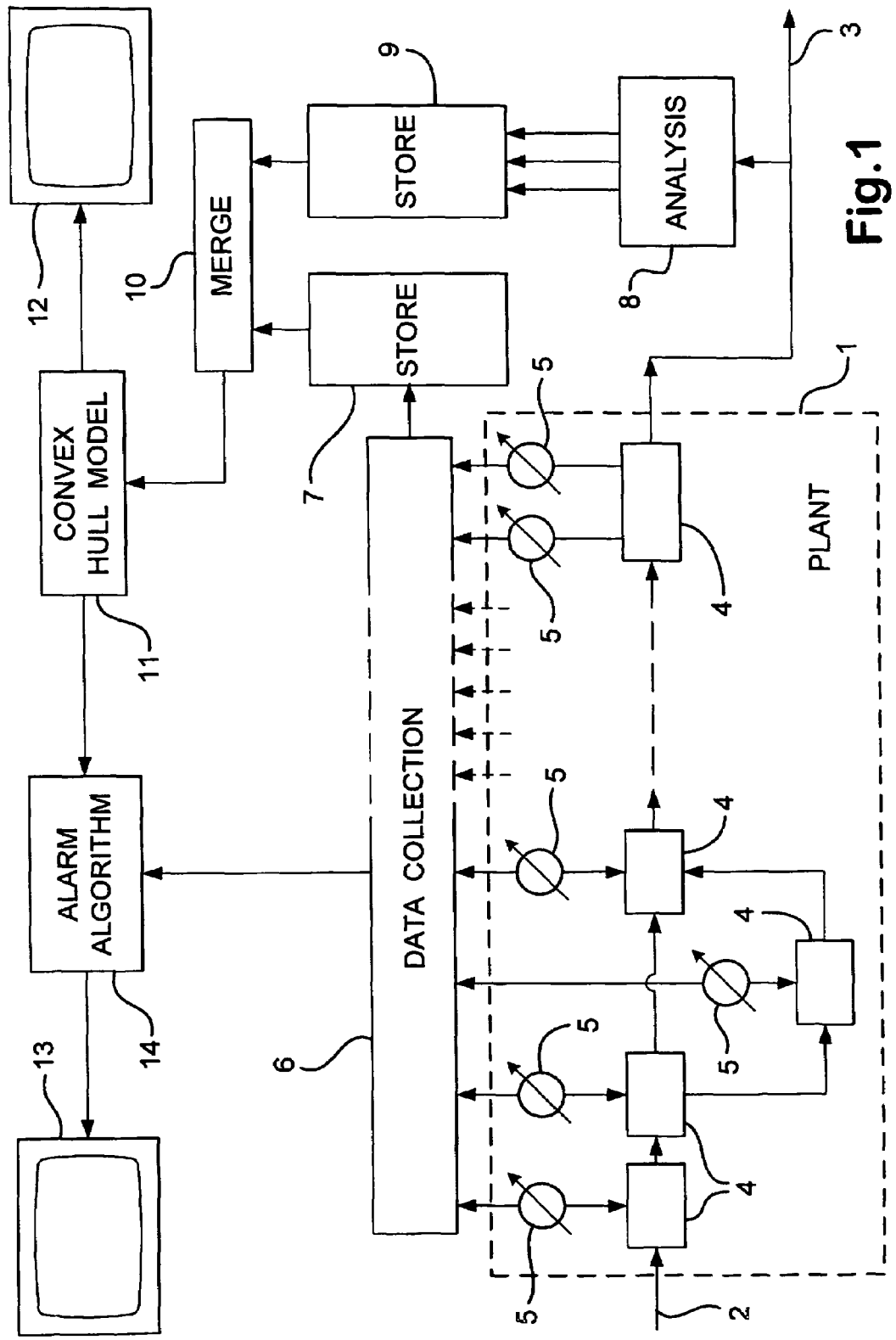
FIG. 1 is a schematic representation of a system according to the invention in the context of collection and utilisation of data derived from operation of a multi-variable processing plant.

Referring to FIG. 1, the plant 1 has an input 2 and an output 3 between which there are, for example, a multiplicity of processing stages 4. The processing within each stage 4 is carried out in accordance with one or more variables that, in this example, are regulated by controllers 5. The values of these variables for each operation or 'run' of the process are communicated to a data collection unit 6 to be accumulated in a store 7. The term 'run' in this context may refer to a discrete operation of the process, but it may also refer to what applies at a discrete point in time within continuous operation.

The outcome at the output 3 of each run of the process, is submitted to a unit 8 for analysis in respect of its quality as determined according to two variables. The values of these two quality-variables are accumulated in a store 9, so that each run of the process and its outcome is defined by an accumulated set of fourteen values, twelve in the store 7 and three in the store 9, for the fourteen variables respectively.

As the process is run again and again, a multiplicity of different sets of fourteen values are accumulated, and from these a selection is made to provide a historical record in the stores 7 and 9 of successive runs representing satisfactory operation of the process. This record is used in the method of the present invention as a basis for selection of the values of the various variables appropriate to achieving a particular outcome. More especially, the fourteen values of each individual set, twelve in the store 7 and two in the store 9, are brought together in a merge unit 10 and each scaled to the range 0 to 1. The scaled values are then processed in a unit 11 to plot them in a multi-dimensional display representation provided by an electronic display unit 12.

The unit 11 operates generally as described in GB-A-2 363 647 and GB-A-2 378 527 to calculate a BOZ envelope representing the best operating zone of the process from a selected, limited group of the sets of data accumulated in the stores 7 and 9, and also a more general, outer envelope calculated from a larger group of the accumulated data. The larger group used for the outer envelope includes the limited group used for the BOZ envelope, the two envelopes being calculated in this case using convex hulls between pairs of the variables and being displayed by the unit 12 in a multi-dimensional space defined by parallel axes.

Figure 2:
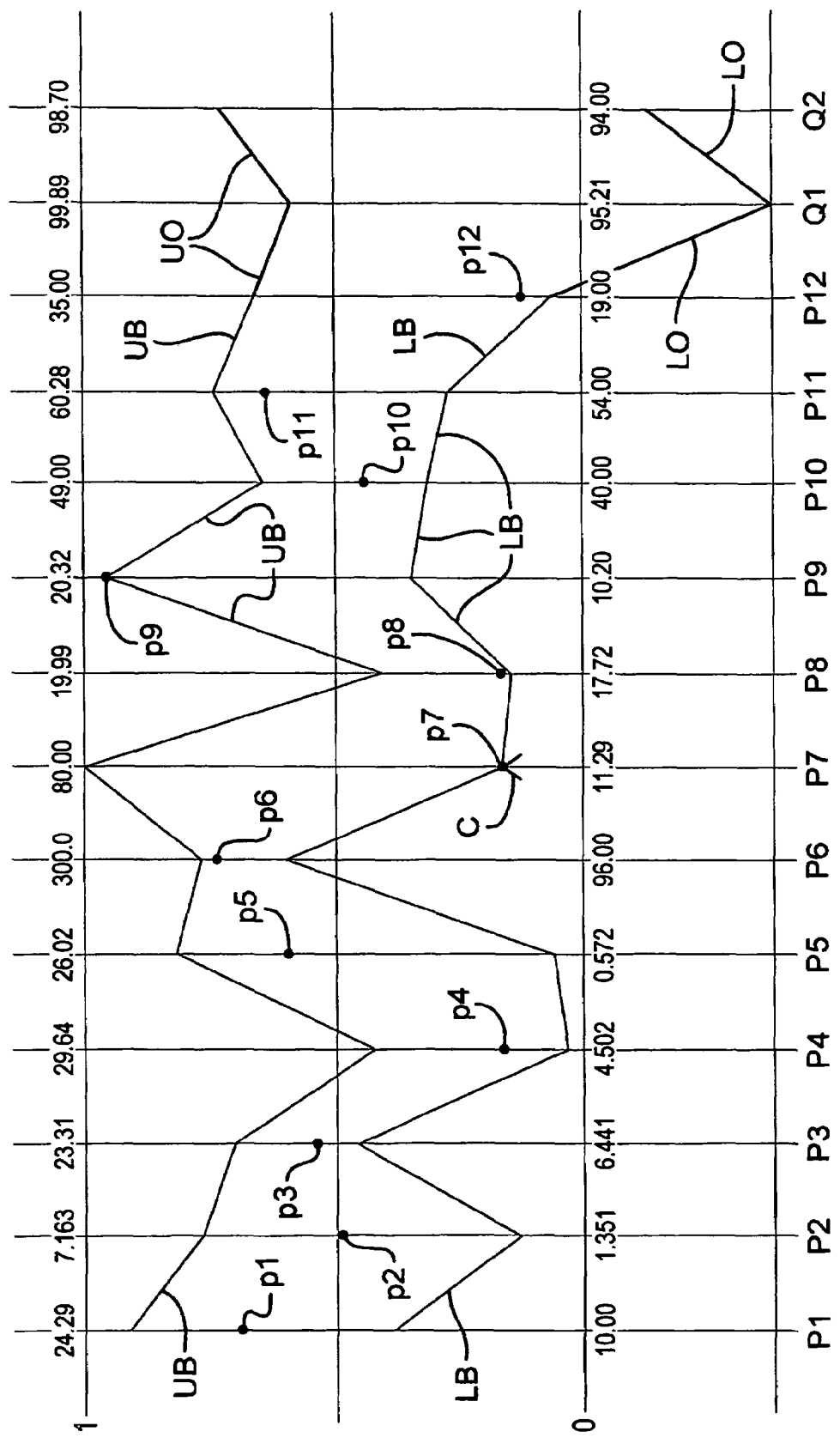
FIG. 2 is illustrative of a display representation in multi-dimensional space defined by parallel coordinate axes, derived during operation of the system of FIG. 1 according to the invention.

FIG. 2 is illustrative of the display representation of the twelve process-variables P1-P12 and two quality-variables Q1-Q2 of the process. The fourteen variables P1-P12 and Q1-Q2 are all scaled to the range 0 to 1 and allocated to respective axes of a set of fourteen parallel axes. The values p1-p12 of the process-variables P1-P12 for the current operating point of the process are plotted on their respective axes.

The current operating point (p1-p12) in the case represented in FIG. 2, has departed from the BOZ, that is to say, from the zone defined between the two polygonal lines which demarcate respectively the upper and lower boundaries UB and LB of the best operating zone. In the illustrated example, the departure arises from the condition in which the plotted value of just one of the process-variables P1-P12, namely the value p7 of the variable P7, is outside the BOZ envelope. This alarm condition is indicated in the display representation by a caret C emphasising the location of the violated limit on the axis of variable P7.

Until the alarm condition arose, the full BOZ envelope for the datapoint was shown, that is to say, for the current condition of the process extending throughout the full range of the fourteen axes for the variables P1-P12 and Q1-Q2. As soon as the alarm condition arises, however, the prediction is no longer valid and the display representation is changed automatically by the system to replace the BOZ envelope by a new envelope as shown in FIG. 2. More particularly, the ranges of the quality-variables Q1 and Q2 are indicated in the new envelope by upper and lower boundary lines UO and LO that are the same as those of the outer envelope for the variables Q1-Q2. The same upper and lower boundaries UB and LB of the BOZ envelope, however, are reproduced in the new envelope for the process-variables P1-P12, and are joined up with the upper and lower boundaries UO and LO, respectively, to provide transition between the axes of the variables P12 and Q1. The upper and lower boundary lines UO and LO extending between the axes of the variables P12 and Q2, are represented in a different colour from the demarcation lines UB and LB so as to show that the limits now indicated for the quality-variables Q1-Q2 have been calculated using the outer envelope.

The limits on quality-variables predicted using the outer envelope, while valid, are often very wide. It would often be useful to have tighter predictions on the quality-variables when the operating point is outside the BOZ. For this purpose a set of nested envelopes may be used, each of which is the envelope of a set of datapoints chosen with successively more restrictive criteria; the envelope with the most restrictive criteria is the BOZ envelope. If there are, for example, four envelopes E1-E4 in all, then the outer envelope E1 encloses a first intermediate envelope E2, which encloses a second intermediate envelope E3, and this second, intermediate envelope encloses the BOZ envelope E4. Then, if an operating point lies outside the BOZ envelope E4 but within intermediate envelope E3, intermediate envelope E3 is used to calculate the limits on the quality-variables. If the operating point lies outside intermediate envelope E3 but inside intermediate envelope E2, intermediate envelope E2 is used to calculate the limits. Otherwise, the outer envelope E1 is used.

The facility by which the boundaries for the quality-variables are changed in dependence upon the location of the operating point, from that of the BOZ to a wider envelope, whether this is directly to the outer envelope as illustrated in FIG. 2, or to, or through, one or more intermediate stages (such as the envelopes E2 and E3), is of assistance to the process-operator. More particularly, it maintains valid indication of the limits applicable to the quality-variables of the product currently being made, even when the process has deviated outside the BOZ.

Although in the case of the method using multiple envelopes described above, the envelopes are nested one within the other, there are circumstances where non-nested envelopes may be utilised with advantage. These circumstances are illustrated by FIG. 3 which shows part of a monitor display of historical datapoints accumulated from multiple process-operations.

Figure 3:
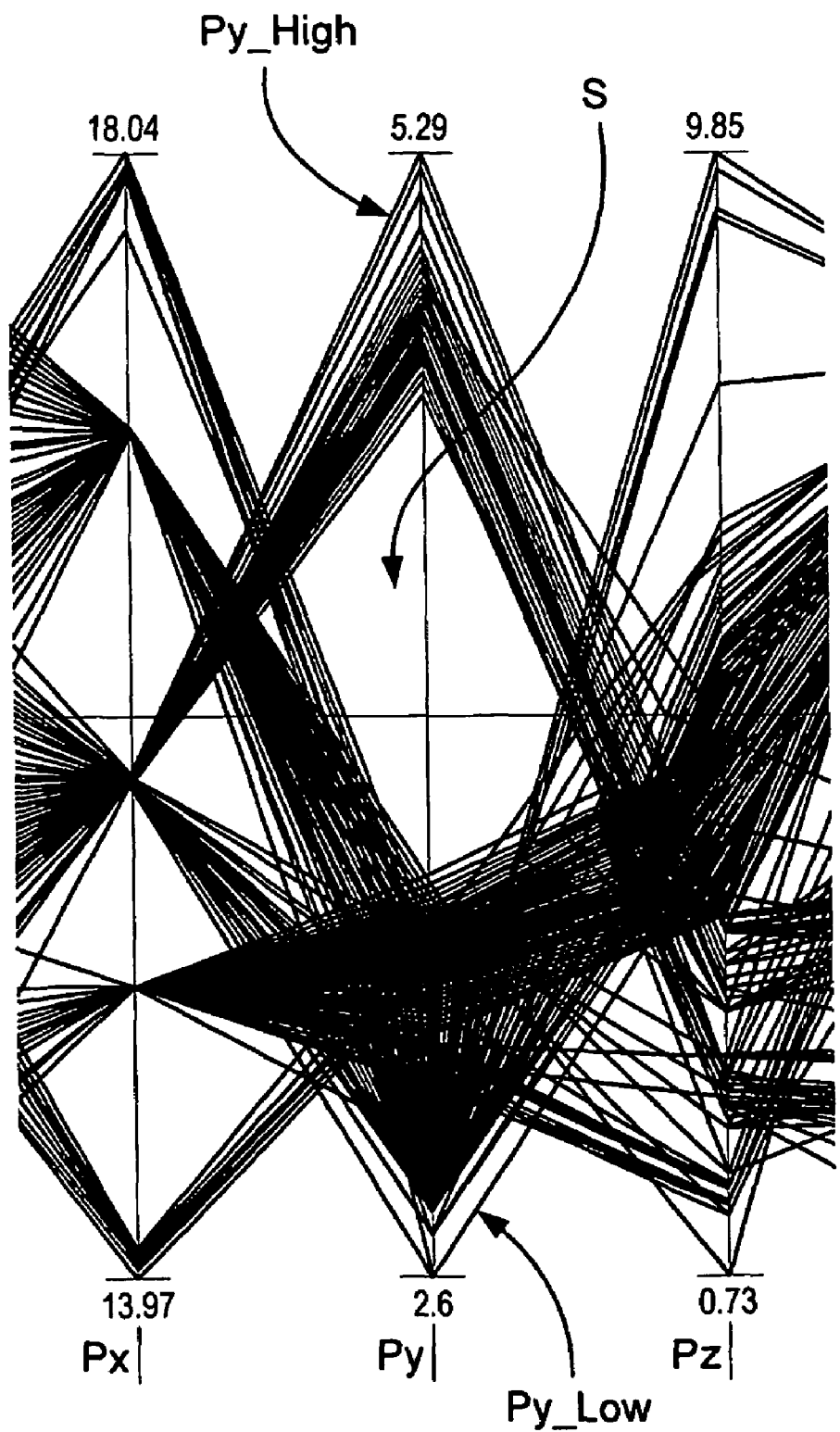
FIG. 3 shows part of a multi-dimensional display of historical data accumulated from multiple process-operations of the plant of FIG. 1.

Referring to FIG. 3, the accumulated data is displayed plotted against a set of parallel axes; only the part of the display between the axes of variables Px, Py and Pz. is represented in FIG. 3. This part of the display indicates that the process has two distinct modes of 'good' operation, namely, modes Py_High and Py_Low in which the values of the process-variable Py are clustered at the top and bottom, respectively, of its range, with an empty space S in between.

Since it is possible to make good product in either of the modes Py_High and Py_Low, a single BOZ for the whole set of datapoints covered, would include the empty space S. This may be avoided by defining two BOZs, say BOZ_Py_High and BOZ_Py_Low, in which the criterion that the value of the process-variable Py is in the top cluster-zone or the bottom cluster-zone of values respectively, is combined with the selection criteria for 'good' operation. The appropriate BOZ is used to calculate operating limits depending on which part of its range the value of variable Py lies in at each time step.

The use of a plurality of separate BOZs has advantage also where the accumulated, historical datapoints are distributed all over the range of a variable, but the BOZ contains distinct clusters that are separated by sub-ranges where 'good' product is never made. Two or more BOZs may be used in these circumstances with the advantage that a more-accurate indication of operating limits of the process-variables and of predicted limits on quality-variables is provided than if one overall BOZ were used.

GB-A-2 378 527 contains description of a method and system for calculating and displaying suggested changes in the values of the control or manipulated variables (namely, of the process-variables having values that can be changed directly by the operator) that will clear current alarms. This method rectifies alarms on dependent or non-manipulated variables, namely, on process-variables which have values that cannot be changed directly by the operator, but whose values change in dependence upon change of control- or manipulated-variables. In this regard, the values of the control-variables are moved in such a way that the limits due to the BOZ on the alarm-dependent variables are moved out to the current values of those variables, thus putting those dependent-variables inside the BOZ. This is only possible if the alarm-dependent variable is within its BOZ range, that is to say, is within the range from minimum to maximum values that ever occur in the BOZ (the upper and lower horizontal axes in the display of FIG. 2 represent the top and bottom of the BOZ range for each variable). If the alarm-dependent variable is not within this range, the outer envelope can be used to generate alarm rectification advice. As the outer envelope represents the full range of process behaviour, it can be used to calculate the effect of the changes in the control-variables on the dependent-variables.

If the current value of a dependent-variable is below the bottom of its BOZ range, the required action is to manipulate the control-variables so that the lower limit on that dependent-variable due to the outer envelope, is above the bottom of its BOZ range. This means that in the real process, the change in the control-variables will cause the value of the dependent-variable to increase to at least its new lower limit due to the outer envelope.

On the other hand, if a dependent-variable is currently above the top of its BOZ range the control-variables must be manipulated so that the upper limit on that dependent-variable due to the outer envelope is below the top of its BOZ range. This means that in the real process the change in the control-variables will cause the value of the dependent-variable to decrease to, at most, its new upper limit due to the outer envelope; the time for this to be completed depends on the process. If when this achieved there are any alarms due to the BOZ, it will be possible to rectify them by the method described in GB-A-2 378 527.

The algorithm for calculating the necessary moves to bring the required limit on a dependent-variable to within its BOZ range, is quite similar to that described in GB-A-2 378 527 for calculating the best set of moves of manipulated-variables for rectifying alarms. The convex hulls involved in the calculations in the present case are those that make up the outer envelope, and the objective function to be minimised, equivalent to the 'total infeasibility' referred to in GB-A-2 378 527, is:

[the sum of (Bottom of BOZ Range minus Lower Limit) over all dependent-variables whose current value is below the bottom of their BOZ range] plus [the sum of (Upper Limit minus Top of BOZ Range) over all dependent-variables whose current value is above the top of their BOZ range].

For each such dependent-variable, the coefficient of the relevant limit with respect to each control-variable can be calculated; for example, using the calculation described in GB-A-2 378 527 with regard to the coefficients of total infeasibility.

The variable with the greatest 'good' effect is found, subject to the condition that the relevant limit is not to be made worse for any such dependent-variable; that is to say, a move that improves the total objective is not allowed if it reduces the lower limit due to the outer envelope on any dependent-variable that is below the bottom of its BOZ range, or increases the upper limit on one that is above the top of its BOZ range. Nor must any dependent-variable currently within the BOZ be forced out of its BOZ range by pushing its lower limit due to the outer envelope above the top of its BOZ range or its upper limit below the bottom.

The coefficients of the BOZ limits on all dependent-variables with respect to the control-variables are also needed, as no new alarms must be created by pushing the BOZ limits on a variable inside its current value. The other limit on moves of control-variables is the range of validity of the coefficients of the objective with respect to the values of the control-variables.

The control-variable with greatest effect is selected and moved to the most restrictive limit on its movement. This is repeated until the relevant limits on all such dependent-variables due to the outer envelope are inside their BOZ range, or no more moves are possible.

The advantage of this feature to process operation is that it provides advice to the process operator on how to bring the operating point back into the best operating zone even when some non-manipulated variables have values outside their full ranges in the BOZ.

Whenever advice to the operator is generated, it would be possible to 'close the loop' by feeding the recommended new values of the control-variables to the on-line control system as new setpoints. The only difference between advisory and closed-loop control is operator confidence.

The outer envelope may be used to avoid moves of the control-variables that will have an adverse effect on the future values of non-manipulated variables. In this regard, use is made of the same calculation as that using the outer envelope for alarm rectification, to calculate the effect on the future values of dependent-variables of a move of a control-variable. In this case the calculated effect is used to ensure that a move of a control-variable to rectify alarms is not made if it will push the value of a dependent-variable which is currently outside its BOZ limits, further in the wrong direction. The method takes each dependent-variable currently in alarm and uses the outer envelope to calculate the effect on the future value of that dependent-variable of moving the value of each control-variable up or down. Thus, if dependent-variable Pq is currently below its lower BOZ limit, and increasing the value of control-variable Pr would decrease the future value of Pq, and decreasing the value of Pr would increase the future value of Pq, then Pr is "OK to Move Down" but not "OK to Move Up". These "OK to Move" properties are used to constrain the choice of moves of control-variables to rectify alarms, when these moves are calculated as described in GB-A-2 378 527.

A variable that is normally a control-variable may not be directly controllable once it goes outside certain limits. In that case it is treated as a dependent-variable and moves of the other control-variables are calculated using the outer envelope to push its future value back into its controllable range.

When the operating point is within the BOZ, the limits on the quality-variables are calculated using the BOZ envelope. Being inside the BOZ means that the values of the quality-variables are already satisfactory, but there may be some quality-variables that it is desirable to maximise or minimise within the BOZ. For example, the BOZ dataset might have been selected by requiring quality-variables on 'good' qualities such as those of yield, efficiency or purity, to be above specified minimum values, but it would still be advantageous to increase them above this. Similarly, it might be desirable to drive some quality-variables, nominally 'bad' qualities such as measures of emissions, as low as possible. As the methods described here calculate limits, not values, optimisation is achieved by maximising the lower limits due to the BOZ on the 'good' qualities and minimising the upper limits due to the BOZ on the 'bad' qualities. In this case the objective, which is to be maximised, is:

[(the sum of the lower limits on 'good' qualities) minus (the sum of the upper limits on 'bad' qualities)].

If it is appropriate, different weightings may be given to different qualities. As before, the coefficients of the objective with respect to each control-variable are calculated. The constraints applicable in this are that no individual quality within the objective may have its relevant limit made worse, and no alarms may be created. The control-variable with the greatest coefficient is moved as far as the constraints and the validity of the coefficients will allow, and this is repeated until no more improvement is possible.

The advantage of this optimisation feature is that the values of quality-variables can be further improved beyond the improvement already achieved by operating within the BOZ. An example of the display representation provided using this feature is shown in FIG. 4 which shows the changed display representation following optimisation.

Figure 4:
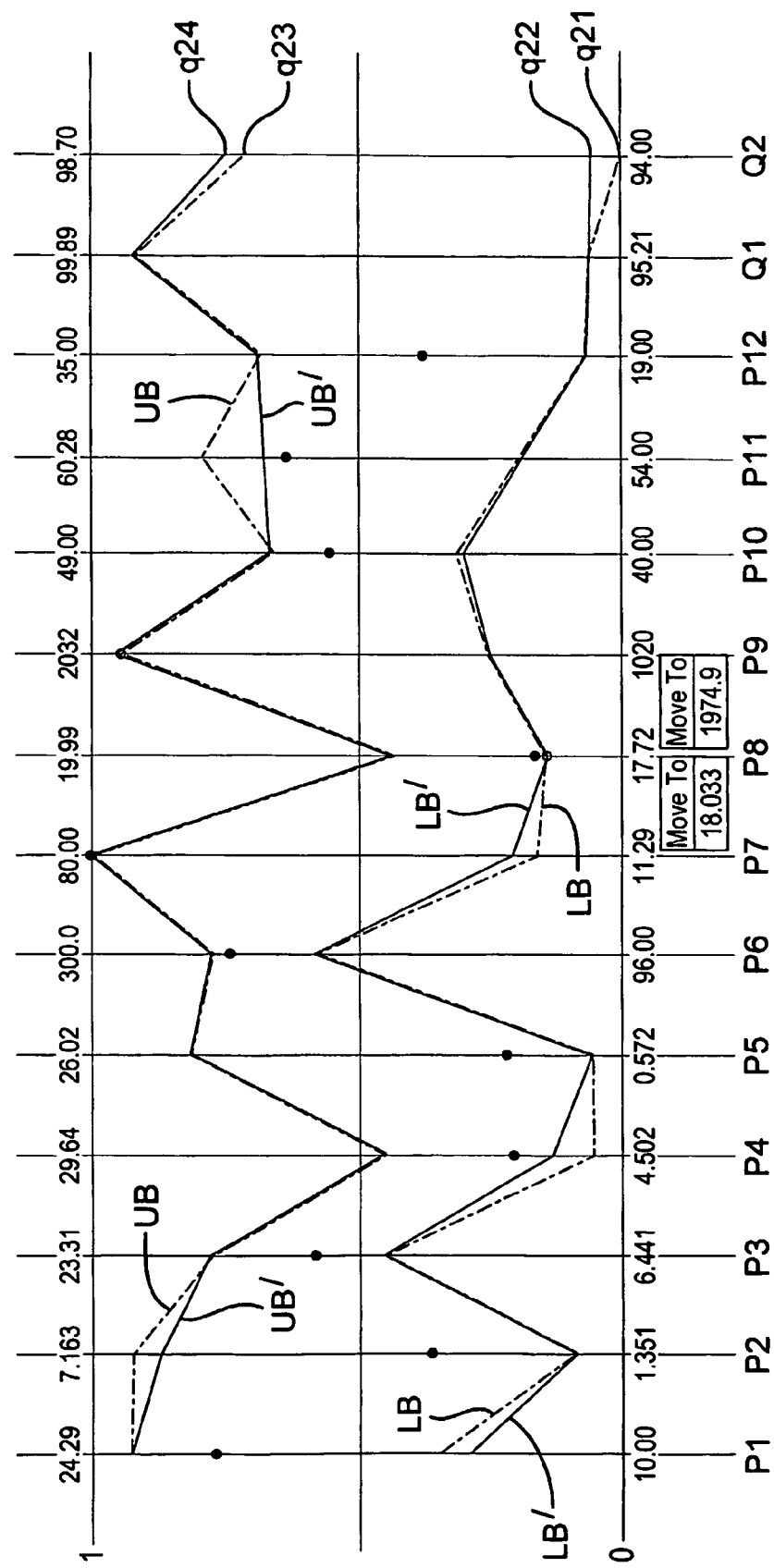
FIG. 4 is illustrative of a further form of display representation in the multi-dimensional space format defined by parallel coordinate axes, derived during operation of the system of FIG. 1 according to the invention.

Referring to FIG. 4, the upper and lower bounds UB and LB respectively, of the envelope that applied before the optimisation process are shown in chain-dotted line, whereas the bounds UB' and LB' of the envelope resulting from it, are shown in full line. In this example, optimisation is brought about by a decrease in the control-variable P8 from value 18.100 to value 18.033 and a decrease in the control-variable P9 from value 1983.0 to value 1974.9. The result is an increase in the lower limit of the quality-variable Q2 from q21 to q22 and an increase in its upper limit from q23 to q24.

In the case where the current operating point is outside the BOZ and moves of the control-variables to bring the process back into the BOZ cannot be found, it is still possible to find moves which will move the predicted limits on the quality-variables towards their BOZ ranges (which normally correspond to specification). The calculation of these limits moves is the same as that described above for optimisation using the BOZ, except that the outer envelope, or an intermediate envelope which includes the current operating point, is used. For each quality-variable, a lower limit due to this envelope which is lower than the bottom of that quality-variable's BOZ range is to be increased, and an upper limit due to this envelope which is greater than the top of its BOZ range is to be decreased. The set of moves of control-variables which has the best overall effect on the limits on the quality-variables due to the envelope used is calculated. In this way it is sometimes possible to improve the product qualities even when it is not immediately possible to bring the process back into its best operating zone.

Although the invention has been described above in the context of a multi-dimensional display representation using parallel axes, the axes may instead, for example, be radial axes of a circular plot such as described in GB-A-2 378 527.

The invention claimed is:

1. A method for operating a controllable multi-variable process, wherein a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation selectively to one or other of a plurality of operational envelopes which are each derived from at least some of the accumulated sets of values and which define bounds for the variables and differ from one another in the bounds defined for at least one of the variables, the particular one of the envelopes in relation to which the current values are indicated being dependent on the current value of at least one of the process-variables.

2. A method according to claim 1 wherein the envelopes are nested within one another.

3. A method according to claim 2 wherein the envelopes differ from one another in the bounds defined for the quality-variables.

4. A method according to claim 3 wherein the particular one of the envelopes in relation to which the current values are indicated is changed when the current value of any one of the process-variables moves outside bounds defined for it by that envelope, the change being to another of the envelopes for which the bounds applicable to the quality-variables are wider.

5. A method according to claim 1 wherein the envelopes are not nested within one another.

6. A method according to claim 5 wherein the current values are indicated in relation to one or other of the envelopes in dependence upon whether the current value of an individual process-variable is within a respective part of its range of values.

7. A method according to claim 1 wherein the current value of one or more of the process-variables is changed to bring about a change of envelope by which the lower limiting-bound indicated by it in relation to one or more of the quality-variables is increased whereas the upper limiting-bound indicated by it in relation to another of the quality-variables is decreased.

8. A method for operating a controllable multi-variable process, wherein a multi-dimensional display representation of the variables according to individual coordinate axes is derived, sets of values of process- and quality-variables accumulated respectively from previous multiple operations of the process are stored, first and second operational envelopes for the process- and quality-variables are calculated, the first and second envelopes being related respectively to bounds for the process- and quality-variables of the process and being derived from the accumulated sets of values to the extent that the first envelope is derived from a selected, limited group of the sets and the second envelope is derived from a larger group that includes said limited group, indicating current values of the process- and quality-variables on their respective axes detecting the condition in which any of the current values of the process-variables lie outside the first envelope, and including representation in the display representation of the first or the second operational envelope at least insofar as it relates to the quality-variables, in dependence upon whether or not, respectively, said condition is detected.

9. A method for operating a controllable multi-variable process, wherein a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation to an operational envelope defining bounds for the process- and quality variables, the envelope being calculated from one or another of different parts of a selected group of the accumulated sets of values according to the current value of at least one of the process-variables, the part of the group from which the envelope is calculated comprising sets of the group which, in distinction to the sets of the other part or parts, have values for said one process-variable clustered on the current value thereof.

10. A system for operating a controllable multi-variable process, wherein a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation selectively to one or other of a plurality of operational envelopes which are each derived from at least some of the accumulated sets of values and which define bounds for the variables and differ from one another in the bounds defined for at least one of the variables, the particular one of the envelopes in relation to which the current values are indicated being dependent on the current value of at least one of the process-variables.

11. A system according to claim 10 wherein the envelopes are nested within one another.

12. A system according to claim 11 wherein the envelopes differ from one another in the bounds defined for the quality-variables.

13. A system according to claim 12 wherein the particular one of the envelopes in relation to which the current values are indicated is changed when the current value of any one of the process-variables moves outside bounds defined for it by that envelope, the change being to another of the envelopes for which the bounds applicable to the quality-variables are wider.

14. A system according to claim 10 wherein the envelopes are not nested within one another.

15. A system according to claim 14 wherein the current values are indicated in relation to one or other of the envelopes in dependence upon whether the current value of an individual process-variable is within a respective cluster-zone of its range of values.

16. A system according to claim 10 wherein the current value of one or more of the process-variables is changed to bring about a change of envelope by which the lower limiting-bound indicated by it in relation to one or more of the quality-variables is increased whereas the upper limiting-bound indicated by it in relation to another of the quality-variables is decreased.

17. A system for operating a controllable multi-variable process, wherein a multi-dimensional display representation of the variables according to individual coordinate axes is derived, sets of values of process- and quality-variables accumulated respectively from previous multiple operations of the process are stored, first and second operational envelopes for the process- and quality-variables are calculated, the first and second envelopes being related respectively to bounds for the process- and quality-variables of the process and being derived from the accumulated sets of values to the extent that the first envelope is derived from a selected, limited group of the sets and the second envelope is derived from a larger group that includes said limited group, indicating current values of the process- and quality-variables on their respective axes, detecting the condition in which any of the current values of the process-variables lie outside the first envelope, and including representation in the display representation of the first or the second operational envelope at least insofar as it relates to the quality-variables, in dependence upon whether or not, respectively, said condition is detected.

18. A system for operating a controllable multi-variable process, wherein a multi-dimensional display representation of the variables according to individual coordinate axes is derived, sets of values of process- and quality-variables accumulated respectively from previous multiple operations of the process are stored, and current values of the process- and quality-variables are indicated on their respective axes in relation to an operational envelope defining bounds for the process- and quality variables, the envelope being calculated from one or another of different parts of a selected group of the accumulated sets of values according to the current value of at least one of the process-variables, the part of the group from which the envelope is calculated comprising sets of the group which, in distinction to the sets of the other part or parts, have values for said one process-variable clustered on the current value thereof.

* * * * *